United States Patent
Kumar et al.

(10) Patent No.: US 12,242,426 B2
(45) Date of Patent: Mar. 4, 2025

(54) BI-DIRECTIONAL SYNCHRONIZATION OF CONTENT AND METADATA BETWEEN REPOSITORIES

(71) Applicant: Open Text Holdings, Inc., San Mateo, CA (US)

(72) Inventors: Pardeep Kumar, Bangalore (IN); Vikash Sharma, Bangalore (IN); Varun Pandit, Bangalore (IN); Anusha Hemanth Veda, Bangalore (IN)

(73) Assignee: OPEN EXT HOLDINGS, INC., Menlo Park, CA (US)

( * ) Notice: Subject to any disclaimer, the term of this patent is extended or adjusted under 35 U.S.C. 154(b) by 130 days.

(21) Appl. No.: 17/462,789

(22) Filed: Aug. 31, 2021

(65) Prior Publication Data

US 2022/0083510 A1   Mar. 17, 2022

Related U.S. Application Data

(60) Provisional application No. 63/078,826, filed on Sep. 15, 2020.

(51) Int. Cl.
*G06F 16/00* (2019.01)
*G06F 16/176* (2019.01)
(Continued)

(52) U.S. Cl.
CPC .......... *G06F 16/178* (2019.01); *G06F 16/176* (2019.01); *G06F 16/2358* (2019.01); *G06F 16/256* (2019.01); *G06F 16/258* (2019.01)

(58) Field of Classification Search
None
See application file for complete search history.

(56) References Cited

U.S. PATENT DOCUMENTS

| | | | | |
|---|---|---|---|---|
| 7,860,826 B2 * | 12/2010 | Freedman | ............ | G06F 16/256 707/610 |
| 8,504,519 B1 * | 8/2013 | Sachs | ...................... | G06F 16/27 707/758 |

(Continued)

FOREIGN PATENT DOCUMENTS

| | | | | |
|---|---|---|---|---|
| CN | 109564512 A | * | 4/2019 | ............ G06F 16/14 |
| CN | 109829679 A | * | 5/2019 | |

(Continued)

OTHER PUBLICATIONS

CN 109829679 A—Project Management Method, Device, Computer Device And Storage Medium, Guo, Jin-hong (Year: 2019).*

*Primary Examiner* — Jean M Corrielus
(74) *Attorney, Agent, or Firm* — Sprinkle IP Law Group

(57) ABSTRACT

Systems, methods and products for synchronization of content and metadata where the content and metadata are shared from a source repository to a target repository. One embodiment of a repository connector system utilizes a monolithic robotic server for scheduled synchronization and a second monolithic manual server for processing manual synchronization requests. A metadata server in the connector system enables sharing and synchronization of mapped metadata between content objects in the source and target repositories. A notification server is provided in the connector system to track notifications of changes to shared content in the target repository, and to replicate these notifications in a local database that is accessible by the synchronization servers to identify changes to the content in the second repository. Each of the servers is coupled to a service registry in the connector system to enable discovery and interaction between the connector system components.

17 Claims, 7 Drawing Sheets

(51) Int. Cl.
  *G06F 16/178* (2019.01)
  *G06F 16/23* (2019.01)
  *G06F 16/25* (2019.01)

(56) References Cited

U.S. PATENT DOCUMENTS

| | | | | |
|---|---|---|---|---|
| 8,745,072 | B2 * | 6/2014 | Sharma | G06F 16/25 |
| | | | | 707/756 |
| 8,799,212 | B2 * | 8/2014 | Rusch | H04L 67/1095 |
| | | | | 707/610 |
| 8,868,666 | B1 * | 10/2014 | Hellwege | H04N 21/4622 |
| | | | | 709/206 |
| 9,348,802 | B2 * | 5/2016 | Massand | G06F 16/00 |
| 9,479,567 | B1 * | 10/2016 | Koorapati | G06F 16/178 |
| 9,519,682 | B1 * | 12/2016 | Pujara | H04H 20/28 |
| 10,055,474 | B1 * | 8/2018 | Wei | G06F 16/178 |
| 10,216,852 | B1 * | 2/2019 | Gupta | G06F 16/9537 |
| 11,531,682 | B2 * | 12/2022 | Kramer | G06F 16/256 |
| 2008/0162588 | A1 * | 7/2008 | Rusch | H04L 67/2885 |
| | | | | 707/E17.046 |
| 2009/0113076 | A1 * | 4/2009 | Long | G06F 16/178 |
| | | | | 709/248 |
| 2013/0138608 | A1 * | 5/2013 | Smith | G06F 16/27 |
| | | | | 707/610 |
| 2013/0292443 | A1 * | 11/2013 | Brown | C03B 33/02 |
| | | | | 225/2 |
| 2013/0347117 | A1 * | 12/2013 | Parks | H04L 65/1066 |
| | | | | 726/26 |
| 2014/0324770 | A1 * | 10/2014 | Marceau | G06F 16/40 |
| | | | | 707/609 |
| 2015/0019480 | A1 * | 1/2015 | Maquaire | G06F 16/2365 |
| | | | | 707/609 |
| 2015/0101021 | A1 * | 4/2015 | McErlean | G06F 16/275 |
| | | | | 707/625 |
| 2016/0291856 | A1 * | 10/2016 | von Muhlen | H04L 67/06 |
| 2016/0292179 | A1 * | 10/2016 | von Muhlen | G06F 16/176 |
| 2016/0292443 | A1 * | 10/2016 | von Muhlen | H04L 63/104 |
| 2017/0017665 | A1 * | 1/2017 | Savenok | H04W 4/021 |
| 2017/0085668 | A1 * | 3/2017 | Gasser | H04L 67/1095 |
| 2017/0091300 | A1 * | 3/2017 | Goldberg | G06F 16/2358 |
| 2017/0169049 | A1 * | 6/2017 | Zhu | G06F 16/176 |
| 2017/0199921 | A1 * | 7/2017 | Khanlarov | G06F 16/2358 |
| 2017/0220605 | A1 * | 8/2017 | Nivala | G06F 16/282 |
| 2019/0079986 | A1 * | 3/2019 | Nichols | G06F 16/176 |
| 2019/0238619 | A1 * | 8/2019 | Mantrana-Exposito | |
| | | | | H04L 63/104 |
| 2021/0342785 | A1 * | 11/2021 | Mann | G06F 40/186 |
| 2023/0222531 | A1 * | 7/2023 | Cella | G06Q 10/06375 |
| | | | | 705/7.31 |

FOREIGN PATENT DOCUMENTS

| | | | | |
|---|---|---|---|---|
| CN | 110083579 | A | * | 8/2019 |
| CN | 110309161 | A | * | 10/2019 ......... G06F 16/2358 |
| FR | 3096799 | A1 | * | 12/2020 ............. G06F 16/22 |
| JP | 2019105964 | A | * | 6/2019 ........... B60R 16/023 |
| WO | WO-2016041529 | A1 | * | 3/2016 |
| WO | WO-2018128432 | A1 | * | 7/2018 ............. G06F 15/16 |

* cited by examiner

BI-DIRECTIONAL SYNCHRONIZATION OF CONTENT AND METADATA BETWEEN REPOSITORIES

RELATED APPLICATION(S)

This application claims a benefit of priority under 35 U.S.C. 119 to U.S. Provisional Application No. 63/078,826 filed Sep. 15, 2020, entitled "CONNECTOR FOR CONTENT REPOSITORIES," which are hereby incorporated herein for all purposes.

TECHNICAL FIELD

The invention relates generally to content management systems, and more particularly to systems and methods for enabling content management systems which may use a microservices architecture to share and bidirectionally synchronize both content and metadata between platforms that conventionally have not been capable of providing these features.

BACKGROUND

This disclosure concerns the sharing of content between repositories, such as when it is desired to share objects from an enterprise's content management system to a cloud-based collaborative content sharing platform. Conventional techniques for sharing content have a number of drawbacks, however. For example, a first enterprise may have content stored in its own repository, but the enterprise may wish to share some of the data in its repository with other users or enterprises in order to collaborate on a project involving the content. The enterprise may therefore share its content by copying the content to a repository of a collaboration platform. Other enterprises may do the same, copying some of their own content from their own repositories to the repository of the collaboration platform. The content in the collaboration repository may then be synchronized with the content in the respective enterprises' repositories.

Conventionally, although the content itself was synchronized between the repositories, the metadata associated with the content was not synchronized. This was a result, in part, because people were not interested in copying the metadata—they only needed the content itself, and had no desire to copy all of the metadata that was stored in the enterprise repository with the content. Thus, customers had no requirement to share or synchronize metadata between the different repositories.

On a technical level, the sharing and synchronizing of metadata also presented a number of problems. For instance, consider that the metadata associated with content in a given repository has its own schemas (metadata types, metadata bindings, etc.) Each repository may have a different schema for metadata, so the metadata in the schema of a first repository may not be compatible with the metadata schema of a second repository. As a result, metadata could not simply be copied from one repository to another in the same manner as the content.

The inability to share and synchronize metadata between repositories can present problems for users. For example, a user may be able to perform a search on a first repository using keywords associated with the content to find a desired document. When the user attempts to perform the same search on a second repository may not find the desired document because the metadata associated with the content stored in the first repository is not also stored with the same content in the second repository.

Another problem with conventional techniques for sharing content relates to the directionality of synchronization. In order for a conventional system to support bi-directional synchronization between source and target repositories, it is necessary to be aware of changes that occur in the target repository at regular intervals. This would normally be achieved by polling the target repository for content changes, which would impose an enormous load on both the source and target repositories. Conventional servers, being monolith servers, already do a great deal of work, so bi-directional synchronization would add to the existing load and would adversely impact its performance. Additionally, target repositories typically do not have an application programming interface (API) that supports the use-case of bi-directional synchronization. Additionally, as noted above, the target repository in a conventional system does not normally store metadata which is associated with the stored content, so it would not be possible to bi-directionally synchronize metadata.

Another problem with conventional techniques relates to the structure of traditional systems. Conventionally, a monolithic server is used to provide synchronization services, but these were normally designed to provide backend services. In other words, they provided no end-user interface, and there was no way for the system to be accessed to make manual requests for synchronization (including via user interfaces and APIs). Further, traditional synchronization servers are commonly configured to process synchronization tasks on a regular schedule (e.g., once every minute) and are typically heavily loaded as a result. If the additional tasks associated with servicing manual requests for synchronization of particular objects were added to the processing load of handling scheduled synchronizations, the additional load would have substantial adverse impacts on the performance of the system, potentially causing delays in the requested synchronization tasks, or possibly even failure to perform the tasks.

It would therefore be desirable to provide systems and methods for synchronization of data between repositories which include features such as synchronization of metadata and bidirectional synchronization without adversely impacting the performance of the system.

SUMMARY

The present disclosure details systems, methods and products for sharing content and metadata between repositories. At a high-level, embodiments disclosed herein provide a connector to synchronize and share content. These embodiments can support multiple repositories, and may share content both unidirectionally and bidirectionally. Some embodiments are implemented in a microservices-type architecture.

In an exemplary embodiment, a connector system is provided to enable synchronization of content and metadata where the content and metadata are shared from a first repository to a second repository. The connector system utilizes a first monolithic synchronization server which is very similar to a traditional synchronization server, in that it enables scheduled synchronization of content between the two repositories. A second monolithic synchronization server is also used in the system to enable manual synchronization of selected files when requested by users or external applications, thereby preventing the additional load of the manual requests from adversely impacting the performance of either the scheduled synchronization tasks on the first monolithic server or the manual synchronization tasks on the second monolithic server. A metadata service is also provided to enable the sharing and synchronization of metadata between content objects in the first repository (which may have several different object types and corresponding metadata) and content objects in the second repository (which may have a single, common object type that includes selected metadata items from the different object types of the first repository). A notification service is also provided in the connector system to track notifications of changes to shared content in the second repository, and to replicate these notifications in a local database that can be accessed by the synchronization servers to identify changes to the content in the second repository without having to poll the second repository. Each of the servers/services is coupled to a service registry in the connector system to enable discovery of the different components and to enable communication and interaction between these components.

One embodiment comprises a repository connector system for bi-directional synchronization. This system includes a synchronization server with a processor and a memory, and first and second data repositories communicatively connected to the synchronization server. The synchronization server configures one or more content shares from the first repository to the second repository, where for each content share, the synchronization server instantiates a notification service instance, and creates a robot account as a collaborator on the content share. The notification service instance replicates notification records corresponding to the robot account to a local notification database. The synchronization server then accesses the local notification database to determine changes in the second repository to data of the content share and synchronizes the changes to the first repository.

In some embodiments, the synchronization server is configured to access the local notification database at regular intervals to identify notification records in the local notification database indicating changes in the second repository to data of the content share.

In some embodiments, each of the one or more content shares is a mapped content share in which a selected subset of content folders on the first repository is mapped to a corresponding set of content folders on the second repository. In some embodiments, each of the selected subset of content folders on the first repository and the corresponding set of content folders on the second repository contains one or more content objects, each of the content objects having corresponding metadata.

In some embodiments, the synchronization server configures the one or more content shares according to administrative user input received via an administrative configuration interface.

In some embodiments, the notification service instance performs a replication loop in which notification records corresponding to the robot account are identified and replicated to the local notification database according to a predetermined schedule.

In some embodiments, the synchronization server performs a synchronization loop according to a predetermined schedule where, in the synchronize loop, the synchronization server accesses the notification records in the local notification database and synchronizes changes corresponding to the notification records from the second repository to the first repository.

In some embodiments, during the synchronization loop the synchronization server parses the notification records in the local notification database, identifies from the notification records changes to specific content objects in the second repository, and makes identified changes to specific content objects in the first repository corresponding to the specific content objects in the second repository.

An alternative embodiment comprises a repository connector system for synchronizing metadata. This system includes a synchronization server including a processor and a memory, and first and second data repositories communicatively connected to the synchronization server. The first data repository stores a first plurality of content objects, each of which has a corresponding object type in the first data repository that is selected from a set of object types defined for the first data repository, where each of the object types defined for the first data repository has a corresponding source metadata schema. The synchronization server stores one or more profiles in the memory, where each profile defines an attribute mapping between a first folder in the first data repository and a second folder in the second data repository. The attribute mapping identifies selected attributes from the source metadata schemas of the object types for content objects contained in the first folder, defines a target metadata schema which is common to all content objects contained in the second folder, and maps the selected attributes from the source metadata schemas to attributes of the target metadata schema. The synchronization server determines, in response to detecting a change to a value of a first attribute of a first content object in the first plurality of content objects, whether the first attribute is mapped to a corresponding attribute of the target metadata schema, and synchronizes the change to the value of the first attribute to the second data repository only if the first attribute is mapped to the corresponding attribute of the target metadata schema.

In some embodiments, the synchronization server further synchronizes a change to a value of a second attribute of a second content object in the second repository to a corresponding attribute of a corresponding content object in the first repository.

In some embodiments, the synchronization server further performs, after the one or more profiles are created and saved, a loop through all content objects in first folder to copy content objects and selected attributes from the first repository to the second repository.

In some embodiments, for at least one of the profiles, one or more attributes of the source metadata schemas are not mapped to attributes of the target metadata schema.

In some embodiments, each of the profiles has a unique mapping of the attributes of the source metadata schemas to the attributes of the target metadata schema.

In some embodiments, the synchronization server further enables inheritance of the target metadata schema by applying the target metadata schema of content objects in a parent folder to content objects in a child folder contained within the parent folder.

In some embodiments, the synchronization server further presents to an administrative user a user interface for configuring the one or more profiles.

In some embodiments, the mapping of the attributes of the source metadata schemas to the attributes of the target metadata schema includes only a subset of the attributes of the source metadata schemas which are selected by a user, and wherein the target metadata schema includes all of the subset of the selected attributes of the source metadata schemas.

In some embodiments, the synchronization server is configured to enable a user to create a content share from the first data repository to the second data repository and to select a previously defined profile, wherein the mapping of the selected previously defined profile is applied to the content share. In some embodiments, in response to creation of the content share, the synchronize server downloads from the first data repository content objects and metadata included in the content share and then uploads to the second data repository the content objects included in the content share with only metadata that is included in the mapping of the selected previously defined profile.

Another alternative embodiment comprises a repository connector system for synchronizing data between repositories. In some embodiments, the system comprises a plurality of servers, each of the servers having a processor and a memory, and a registry which is coupled to the servers, wherein the registry is configured to maintain a record including a health of each of the servers, the registry further enabling discovery of the servers. The servers include a first monolithic server which is configured to automatically perform periodic synchronization of a set of content folders between a first repository and a second repository according to a defined configuration. The servers also include a second monolithic server which is configured to perform synchronization of one or more individual content objects and corresponding metadata between the first repository and the second repository in response to a request received from an external requestor, where the one or more individual content objects and corresponding metadata are identified in the request.

In some embodiments, the servers include a notification server which is configured to monitor changes to content stored in the second repository, including the first set of content folders and the individual content objects. In some embodiments, the notification server is further configured to parse the notifications and to store ones of the notifications that correspond to content comprising the set of content folders and the individual content objects in a persistent data store.

In some embodiments, the servers include a metadata server configured to maintain mappings between content stored in the first repository and content stored in the second repository. In some embodiments, the metadata server is further configured to map selected attributes of one or more content object types in the first repository to corresponding attributes of a single common object type in the second repository.

In some embodiments, the first monolithic server performs the periodic synchronization without intervention by end users or external applications.

In some embodiments, the functions of the systems described above may be implemented in methods or computer program products.

Numerous alternative embodiments may also be possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, or rearrangements may be made within the scope of the disclosure without departing from the spirit thereof, and the disclosure includes all such substitutions, modifications, additions, or rearrangements.

BRIEF DESCRIPTION OF THE DRAWINGS

The drawings accompanying and forming part of this specification are included to depict certain aspects of the disclosure. It should be noted that the features illustrated in the drawings are not necessarily drawn to scale. A more complete understanding of the disclosure and the advantages thereof may be acquired by referring to the following description, taken in conjunction with the accompanying drawings in which like reference numbers indicate like features.

DETAILED DESCRIPTION

Figure 1:
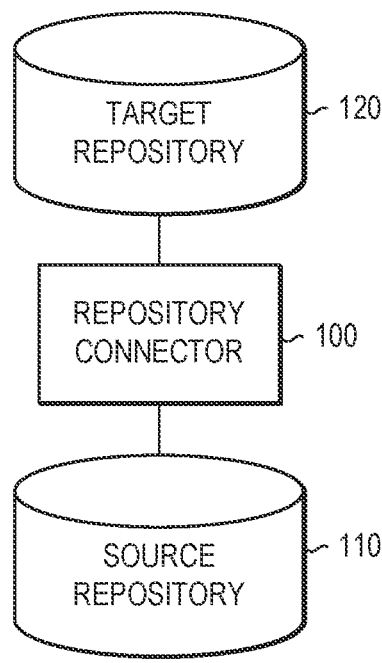
FIG. 1 is a diagram illustrating, at a high level, the components of a content synchronization system in accordance with some embodiments.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the embodiments in detail. It should be understood, however, that the detailed description and the specific examples are given by way of illustration only and not by way of limitation. Various substitutions, modifications, additions and/or rearrangements within the spirit and/or scope of the underlying inventive concept will become apparent to those skilled in the art from this disclosure.

It is often desirable to share and synchronize data between two different repositories. For example, a first enterprise may have data stored in its own repository, but the enterprise may wish to share some of the data in its repository with other users/enterprises in order to allow the others to collaborate on a project involving the data. The enterprise may therefore share its data by copying the data from its own repository to a repository of a collaboration platform. Other enterprises may do the same, copying some of their own data from their own repositories to the repository of the collaboration platform. Preferably, the content in the collaboration repository will then be synchronized with the content in the respective enterprises' repositories to ensure that the copies of the data in the different repositories are all the same.

The data shared between repositories may include both content objects and metadata associated with the content objects. Conventionally, the content objects were synchronized between repositories, but the metadata associated with the content objects was not synchronized. Typically, users were not particularly interested in copying the metadata—they only needed the content itself so that they could perform the required tasks for the collaboration in which the content was used. Consequently, customers had no requirement for metadata to be synchronized between repositories.

Additionally, there were technical issues that made it impractical to synchronize metadata, such as the differences between metadata schemas in the different repositories. Commonly, metadata has its own schemas (metadata types, metadata bindings, etc.) Each repository may have a different schema for metadata, so the metadata in the schema of a first repository may not fit into the metadata schema of a second repository. As a result of the different metadata schemas, it was not possible to simply copy metadata from one repository to another. (By comparison, content is simply data, which has a single type and can therefore easily be copied from one repository to another.)

As noted above, conventional systems for sharing content traditionally have not had the functionality to share the metadata associated with the content as well as the content itself. This can make it more difficult for collaborators to use the content. For example, when a user searches a first source repository for a particular keyword, the search engine makes can use metadata associated with the content stored in the repository to find the keyword in the search. More specifically, the search engine searches for this keyword in the metadata associated with the content in the repository. Then, responsive to the search, the search engine returns content objects that include the searched keyword in their metadata.

If, however, the same search is performed on a copy of the content that has been stored in a target repository using conventional techniques, the user will not get the same results. Although all of the content may have been copied from the first repository to the second repository, the second repository does not store the metadata for example, the metadata schema implemented in the second repository is incompatible with the metadata schema of the first repository). A search for the keyword in the second repository will therefore fail because this repository does not contain the metadata associated with the stored data objects.

Another problem with conventional systems for synchronizing repositories is that they commonly do not enable bidirectional synchronization of content. Existing content management systems that are capable of content synchronization typically require the target repository to be polled in order to identify changes that need to be synchronized to the source repository. When a monolithic server is used, this server is already heavily loaded, so it cannot normally support the added load of polling the target repository and performing operations to synchronize content from the target repository back to the source repository without adversely impacting the performance of the server. Additionally, some collaborative sharing platforms (corresponding to the target repository) do not even provide an API which supports the use-case of bidirectional synchronization.

In order to address these problems, embodiments disclosed herein provide a repository connector that is used to synchronize content (including metadata) between repositories. Various embodiments include new systems, methods and products that use a new architecture for a connector system between repositories, where the architecture uses elements of traditional systems (separate monolithic synchronization servers for robotic and manual synchronization) and microservice elements (a metadata service, a notification service, and a service registry) to provide features that were not previously available. The new repository connectors support metadata synchronization between content management systems, such as when content is shared from the repository of an enterprise's content management system to a cloud-based collaboration platform. A user interface (UI) is provided to enable selection of the specific metadata that is of interest when a set of files is shared from the first repository to the second repository. The UI enables configuration of the fileshare (which may also be referred to herein as a content share, or simply as a "share") so that particular selected metadata attributes of various different object types in the first repository are mapped to a common object type in the second repository. Changes in both the content and the selected, mapped attributed A notification service monitors changes of the metadata in the repositories and, whenever changes occur (in the source repository for the unidirectional case, or on any side the repositories in the bidirectional case), the metadata will be immediately synchronized to the other repository. Thus, there is a source repository and target repository, and the changes in the repositories will be monitored, and notifications will be provided, and the metadata will be synchronized. When the repositories have been synchronized, it is possible to search the target repository using the metadata that has been synchronized (which was not previously possible).

At a high-level, embodiments disclosed herein provide a connector system to enable content and metadata that is shared from a first repository to a second repository to be synchronized, both unidirectionally and bidirectionally.

Referring to FIG. 1, a diagram illustrating, at a high level, the components of a content synchronization system is shown. In this example, a repository connector 100 is coupled to a first repository 110 and a second repository 120. Repository 110 may be, for example, a repository of a content management system and/or operated by an enterprise. Repository 110 stores content which is owned or controlled by the enterprise. Repository 110 shares the content stored therein to a second repository 120, which may be the repository of a filesharing or content collaboration platform, for example.

It should be noted that, although repository connector 100 is depicted in this figure as being connected between repository 110 and repository 120, the repository connector need not be physically located between the two repositories. For instance, each repository connector 100, repository 110 and repository 120 may be connected to a network (e.g., the Internet). In such a system, the repository connector may control the transfer of information between the two repositories without being positioned to physically intercept the information.

Figure 2:
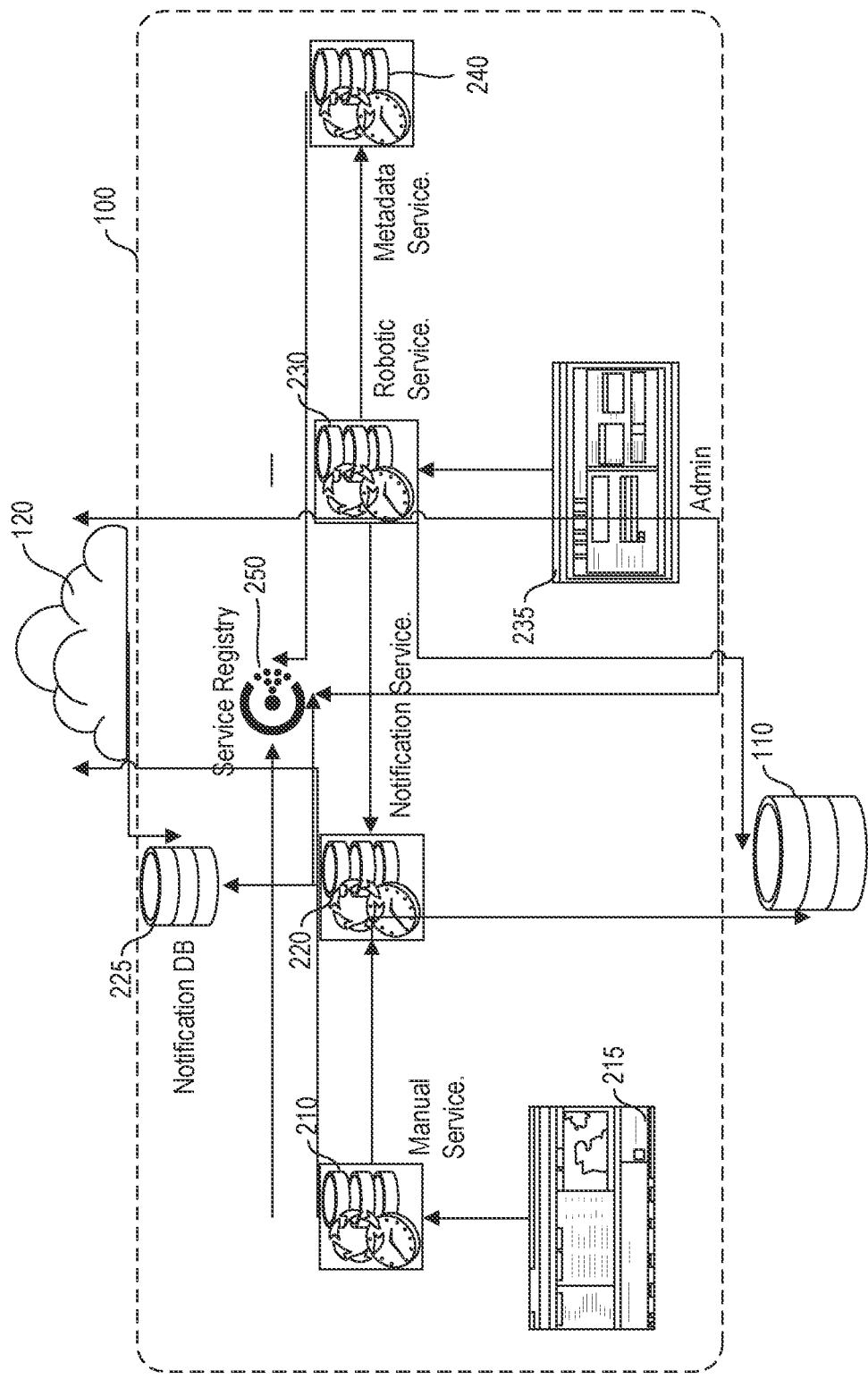
FIG. 2 is a diagram illustrating the structure of the exemplary repository connector system of FIG. 1 in more detail in accordance with some embodiments.

Referring to FIG. 2, the structure of the exemplary repository connector system is shown in more detail. Again, the figure depicts a repository connector 100 which is coupled to a first repository 110 and a second repository 120. In this example, repository 110 is assumed to be a repository for content owned by an enterprise, while repository 120 is assumed to be a filesharing or content collaboration platform, where content owned by the enterprise is shared from repository 110 to repository 120. Since content is being shared from repository 110 to repository 120, repository 110 may, for convenience or clarity, be referred to herein as a source repository, while repository 120 may be referred to as a target repository. This should not be construed to imply that content can only be transferred from repository 110 to repository 120, or that content is synchronized only from repository 110 to repository 120. Both content transfers and synchronization of content (and metadata) may be unidirectional or bidirectional.

As depicted in FIG. 2, repository connector 100 includes four primary servers: manual synchronization server 210, notification server 220, robotic synchronization server 230 and metadata server 240. Each of these servers is coupled to a service registry 250. Service registry 250 enables each of the servers to discover the other components of the connector and communicate with those components.

An administrative interface 320 is coupled to robotic synchronization server 230 in order to enable an administrative user to provide input to configure the server with respect to content shares (e.g., folders of content to be shared from the source repository to the target repository) and synchronization of the shared content. A client interface 215 is coupled to manual synchronization server 210 in order to enable users to manually synchronize content (e.g., specific files or other content objects) between repositories 110 and 120. Notification server 220 is coupled to a notification database 225 which, as will be discussed in more detail below, stores notification records replicated from repository 120.

Repository connector 100 makes use of existing technologies by incorporating robotic synchronization server 230 as a traditional monolithic server. This server is configured to perform scheduled synchronizations of files that are shared from source repository 110 to target repository 120. An administrative user can access server 230 via administrative interface 320 to configure the sharing of content between the servers, as well as the schedule for synchronization of the content. Typically, robotic synchronization server 230 will be configured at a folder-level. In other words, the administrative user may configure the system to share one or more folders of content, where each folder may contain a set of content objects. The folders may include subfolders (or a hierarchy of subfolders) which may themselves contain corresponding sets of content objects.

Manual synchronization server 210 also makes use of a monolithic server to perform the corresponding manual synchronization functions. Manual synchronization server 210 may therefore be structurally the same as robotic synchronization server 230, but will be configured to receive and process manual synchronization requests of particular content objects (or sets of content objects) rather than performing, at scheduled intervals, synchronizations of an entire "share" of content. A manual synchronization interface 215 is coupled to manual synchronization server 210 to enable end-users and/or external applications to submit requests for manual synchronization operations. Interface 215 may comprise a graphical user interface for end-users and/or application programming interfaces (APIs) for external applications.

While manual synchronization server 210 and robotic synchronization server 230 are monolithic servers, they are configured to interact with service registry 250, which maintains information about these servers so that they can interact with other services (e.g., metadata service 240 and notification service 220) within the repository connector. Manual synchronization server 210 and robotic synchronization server 230 self register with service registry 250, providing information such as whether or not these servers are available (the "health" of the servers), and how other services can interact with them (e.g., discoverability information). It should be noted that the other services within repository connector 100 also interact with service registry 250 in a similar manner, the interaction with manual synchronization server 210 and robotic synchronization server 230 is notable because these are monolithic servers rather than micro services.

In addition to manual and robotic synchronization servers 210 and 230, repository connector 100 includes servers which may be implemented as more traditional micro services. In the embodiment of FIG. 2, these servers include notification server 220 and metadata server 240.

Notification server 220 is configured to identify changes that are made to content in repository 120, and to replicate notification records corresponding to these changes in a local notification database 225. Notification database 225 is local to notification server 220 and connector 100—the notification records stored by repository 120 are considered to be remote from (or external to) the repository connector. By making the notification records available in local notification database 225, it is not necessary for the synchronization servers to poll repository 124 changes when they are performing synchronization operations. This increases the speed and efficiency of the synchronization and reduces the load on the synchronization servers. The operation of notification server 220 will be explained in more detail below.

Metadata server 240 which is incorporated into repository connector 100 enables the synchronization of metadata that is associated with content objects which are shared from repository 110 to repository 120. As explained above, content objects in repository 110 may have multiple different types, each of which may have a corresponding, unique metadata schema. Content objects in repository 120, on the other hand, are assumed to have a single type, was a single corresponding metadata schema. Because of the differences between the metadata schemas of the content objects on the different repositories, it is necessary to provide metadata server 240, which enables the mapping of metadata attributes from the schemas of repository 110 to the common schema of repository 120. Metadata server 240 thereby overcomes the incompatibility between the metadata schemas of repository 110 and repository 120 and enables the synchronization of metadata between these two repositories. This will be discussed in more detail below.

Figure 3:
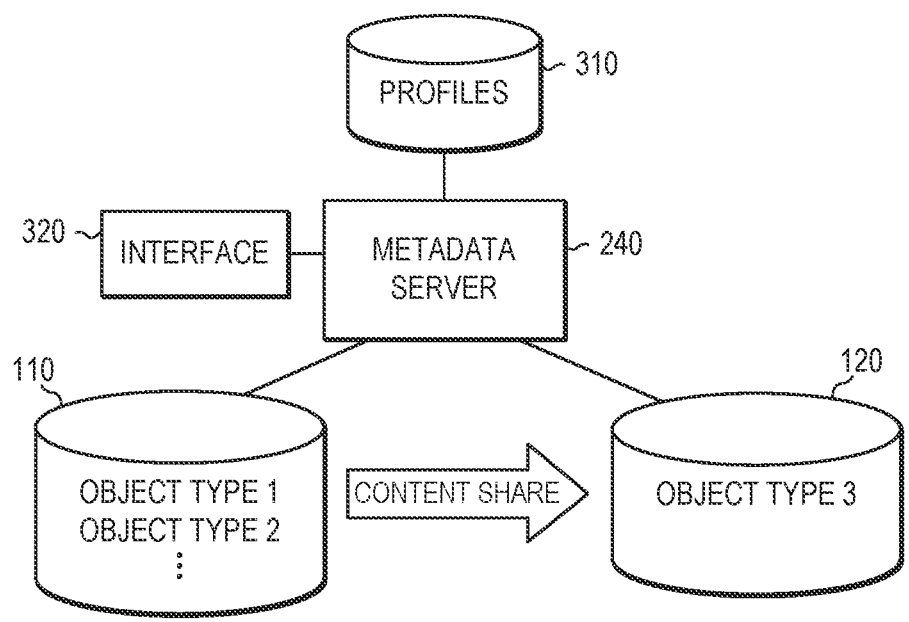
FIG. 3 is a diagram illustrating the sharing of content from a first repository to a second repository in accordance with some embodiments.

Referring to FIG. 3, a diagram illustrating the sharing of content from a first repository to a second repository in accordance with some embodiments is shown. As depicted in this figure, content is shared from a first repository 110 (the source repository) which, as noted above, may be a repository of content owned by an enterprise. The content is shared to a second repository 120 (the target repository) which may be a filesharing or content collaboration platform. Metadata server 240, as a component of repository connector 100 (not explicitly shown in this figure), is coupled to the source repository and the target repository. Metadata server 240 is coupled to a database 310 which stores profiles for content sharing, as well as an administrator interface 320 which enables an administrative user to configure the profiles for the content shares.

Figure 4:
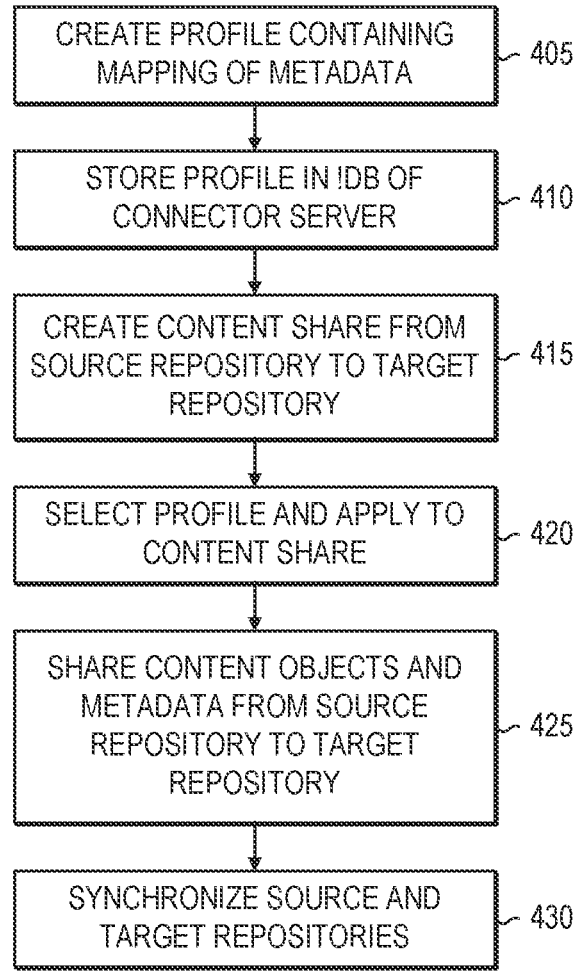
FIG. 4 is a flow diagram illustrating the sharing and synchronization of content and associated metadata using the metadata server in accordance with some embodiments.

Referring to FIG. 4, a flow diagram illustrating the sharing and synchronization of content and associated metadata using the metadata server in accordance with some embodiments is shown. As illustrated here, an administrative user first creates a profile that can be associated with a content share (405). The profile contains a mapping of metadata from the various object types of the content objects stored in the source repository to a single, common object type of content objects that are stored in the target repository. An example of this mapping is shown in FIG. 5.

As mentioned above, the source repository contains content objects that may have multiple, different types. Each object type may have its own, unique set of metadata attributes. In the example of FIG. 5, two different object types (type 1 and type 2) are shown. Each object type has a corresponding set of metadata attributes. In this case, object type 1 has the metadata attributes A, B, and C, while type 2 has the metadata attributes B, D, and E. The set of metadata attributes for each object type comprise the metadata schema for that object type.

When the user creates a profile for a content share, the user first determines which of the metadata attributes of the source object types are of interest. For example, the user may be interested in metadata attributes A, B, and E, but may not care about attributes C and D. The user will select these attributes of interest to be included in an object type which will be defined for the shared content objects in the target repository.

Figure 5:
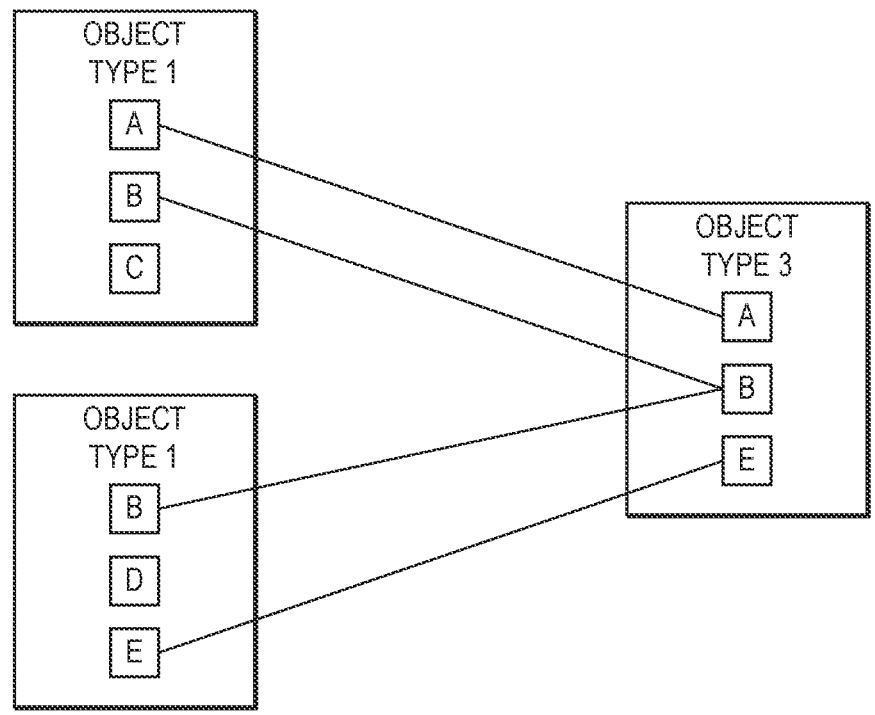
FIG. 5 is a mapping of metadata from the object types of a source repository to an object type of a target repository in accordance with some embodiments.

In the example of FIG. 5, the object type for the target repository will include metadata attributes A, B and E, but will not include attributes C and D. Thus, for a source object type 1, corresponding metadata attributes A and B will be mapped to attributes A and B of the target object type's metadata schema. When content objects having content type 1 are shared from the source repository to the target repository, the values of metadata attributes A and B will be stored in the target repository along with the content itself. Metadata attribute C of the source object type is not mapped to the schema of the target object type, so the value of this attribute will not be copied to the target repository with the content object.

For source object type 2, attributes B and E will be mapped to corresponding attributes B and E of the target object type metadata schema. When objects having content type 2 are shared from the source repository to the target repository, the values of metadata attributes B and E will be stored in the target repository with the corresponding content. Since metadata attribute D of the source object type is not mapped to a corresponding attribute of the metadata schema of the target object type, the value of this attribute will not be copied to the target repository along with the content.

Referring again to the flow diagram of FIG. 4, once the profile containing the mapping of metadata attributes has been created, it is stored in a profile database (410). The user may create a number of different profiles which have different mappings of metadata from one repository to another. When it is desired to share content from the source repository to the target repository, the user creates a "share" of the content (415). As used herein, a "share" is simply the sharing of content from the source repository to the target repository. The user may select one or more content objects or folders to be shared to the target repository. Preferably, the user selects a folder which contains one or more content objects. The user will preferably share a folder of content, and the collection of content objects represented by this folder will all have a common mapping of metadata as defined by a selected profile.

When the user creates the share, a profile will be selected from those available in the profile database, and the selected profile will be applied to the folders and content objects in the share (420). That is, the metadata attributes of the content shared from the source repository will be mapped to the metadata attributes of the content in the target repository as defined by the metadata mapping of the selected profile.

After the profile has been applied to the share, the content is copied from the source repository to the target repository (425). In one embodiment, each content object with its corresponding metadata is retrieved from the source repository, then the content object is copied to the target repository with only those metadata attributes which, according to the selected profile, or mapped from a source object type metadata schema to the target object type metadata schema. If the content object includes a metadata attribute that is not mapped, the value of this attribute will be discarded when the content object is copied to the target repository. The value of the attribute will be retained with the original content object stored in the source repository.

Figure 6:
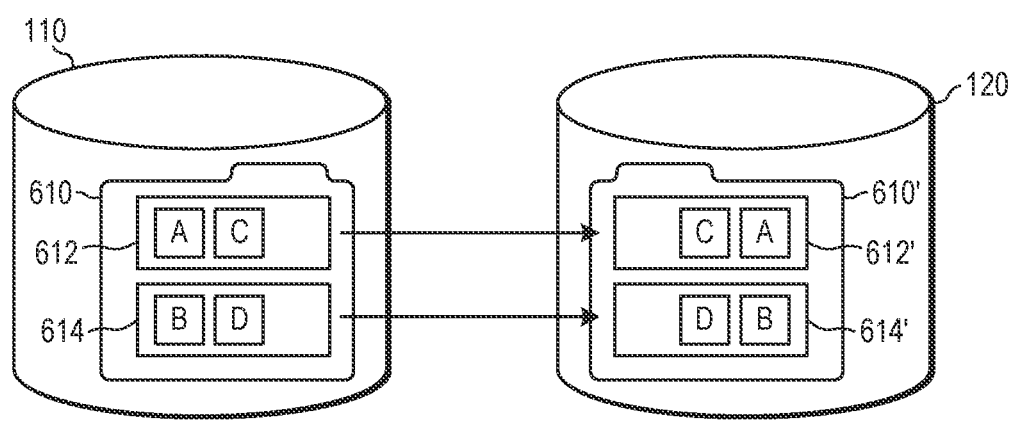
FIG. 6 is a diagram illustrating an example of the sharing of several content objects having different object types in acc with some embodiments.

An example of the sharing of several content objects having different object types is illustrated in FIG. 6. As depicted here, two content objects (612, 614) are stored within a folder 610 in source repository 110. Content object 612 includes values for attributes A and C, while content object 614 includes values for attributes B and D. When folder 610 is shared into folder 610' of target repository, content object 612 is first copied. Since metadata attribute A is mapped from the source object type to the target object type, the value of this metadata is copied with the content of the object. Since metadata attribute C is not mapped from the source object type to the target object type, the value of this metadata is not copied with the content. As a result, the copy 612' of the content object in the target repository has a value for metadata attribute A. Although, as shown in FIG. 5 the target object type includes attributes B and E as well, since source object 612 does not have these attributes, no values are provided for these attributes in the copy 612' of the object in the target repository (they will have null values).

After content object 612 is copied, content object 614 is copied. In this case, the object has values for metadata attributes B and D. Since attribute B is included in the metadata schema of the target object type, the value of this attribute will be copied to the target repository with the content of the object. Since attribute D is not mapped to the target object type, the value of this attribute will not be copied to the content object 614' in the target repository. Thus, the copy of the content object 614' in the target repository will have a value for attribute B, but not for attributes A and E (which will have null values).

After the content has been shared from the source repository to the target repository, the content and associated metadata will be monitored for changes, and the changes will be applied to the content and metadata in the other repository as needed to synchronize the content and metadata in the two repositories (430).

While the operations disclosed herein as to the creation and configuration of profiles and the creation and configuration of mapped content shares are performed in one embodiment by a connector server, these functions and other described functions may be distributed among the various connector components in various ways in alternative embodiments.

Figure 7:
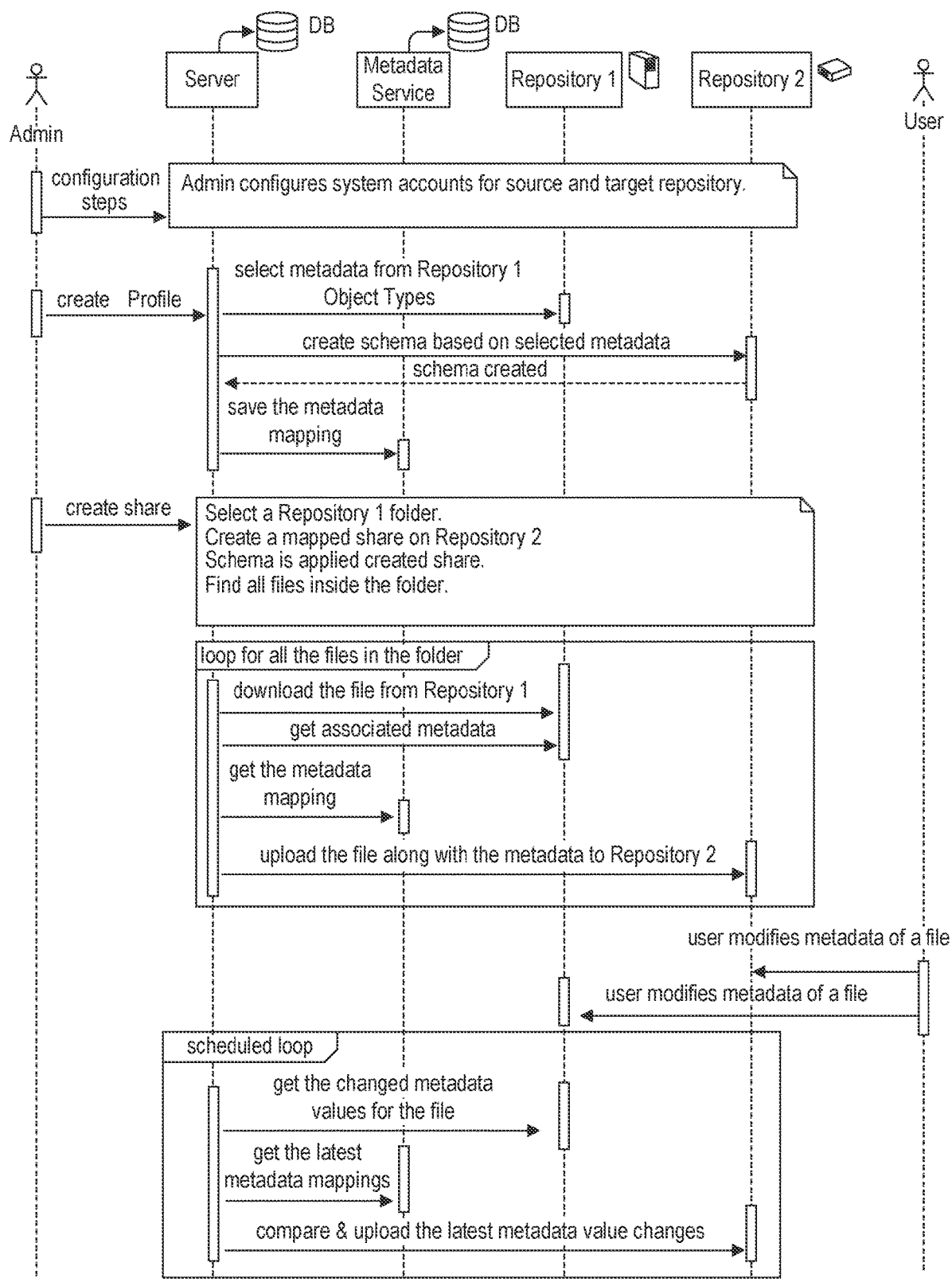
FIG. 7 is a diagram illustrating interactions between an administrative user and components of the repository connector for sharing and synchronization of content and metadata in accordance with some embodiments.

Referring to FIG. 7, a diagram illustrating interactions between an administrative user and various components of the system in regard to the sharing and synchronization of content and metadata in accordance with some embodiments is shown.

As depicted in this figure, an administrative user initially configures system accounts for the first (source) and second (target) repositories. The configuration information is stored in the database of the repository connector server. The administrative user then creates one or more profiles which are used to share and synchronize the content and metadata between the repositories. In order to create a profile, the administrative user views the different object types and corresponding metadata that are available in the source repository. The administrative user then selects one or more of the metadata attributes that are associated with the available source repository object types. The selected metadata attributes are then used to create a metadata schema for content objects in the target repository (where the schema comprises the selected metadata attributes). Each of the selected metadata attributes is mapped from the corresponding source object type to the target object type, and this mapping is saved by the connector server. This process is repeated to create as many profiles as are desired.

The administrative user can then create a share between the source and target repositories. In this example, the administrative user selects a folder in the source repository and creates a share of the selected folder to a corresponding folder in the target repository. The administrative user selects a desired profile from those stored on the connector server and applies this profile to the created share. The created share is saved in the database of the connector server.

After the share has been created and configured (e.g., the appropriate profile applied), the connector server performs a loop for each of the content objects that are included in the share. For each of these content objects, the connector server performs a share process which includes downloading the content object and associated metadata from the source repository, determining from the metadata mapping of the applied profile which of the content objects metadata is mapped to the object type of the target repository, and uploads the content object with values of the metadata attributes that are mapped to the target repository's object type.

After the content and mapped metadata have been uploaded from the source repository to the target repository, the content objects may be changed by an end-user. The changes may be made to content objects and/or metadata in either the source repository or the target repository. FIG. 7 illustrates the synchronization of metadata following changes to the attributes in the source repository. Synchronization following changes to the target repository is discussed below in connection with FIGS. 8 and 9.

As noted above, the connector system supports both unidirectional and bidirectional synchronization. Unidirectional or one-way synchronization normally involves identifying changes to the content in the source repository and making those changes to the content in the target repository. Bidirectional synchronization further involves identifying changes to the content in the target repository so that those changes can be made to the content in the source repository. In order to avoid performance issues associated with, for example, polling the target repository, embodiments disclosed herein use a notification service. When changes are made to the target repository, notifications of the changes are provided to collaborating users, and the notifications are copied to a local notification database so that they can be easily accessed without the synchronize server having to poll the target repository as it performs synchronize operations. The changes which are replicated in the local notification database, can be analyzed to determine which of the changes actually require synchronization. For example, if there have been multiple changes to a particular content object, it may only be necessary to synchronize the last change to the source repository. At a scheduled time, the connector server can access the notification database to identify the information that needs to be synchronized. The connector server can then use the notification data to synchronize the content and/or metadata from the target repository to the source repository.

Figure 8:
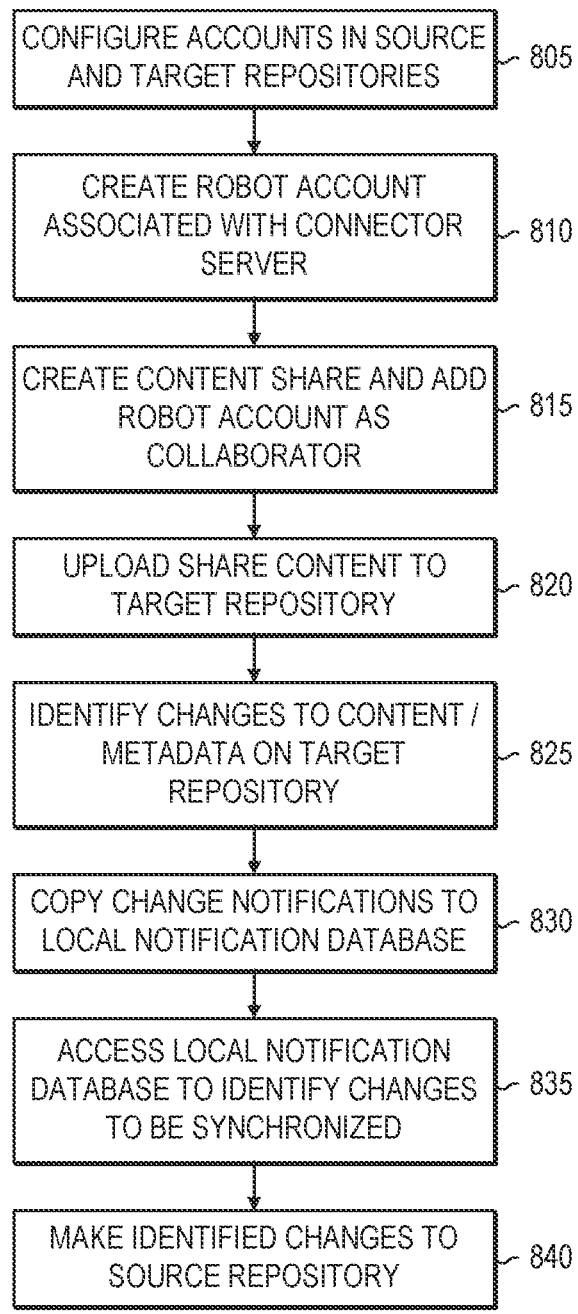
FIG. 8 is a flow diagram illustrating the tracking and use of notification information for synchronization of content and/or metadata from the target repository to the source repository in accordance with some embodiments.

Referring to FIG. 8, a flow diagram illustrating the tracking and use of notification information in connection with the synchronization of content and/or metadata from the target repository to the source repository in accordance with some embodiments is shown. In this embodiment, the accounts are first configured by an administrative user for the source and target repositories (805). The administrative user also creates a robot account (810). The robot account is not associated with an actual user, but is instead used as a means to monitor changes in the target repository. When a content share is created by the administrative user, the robot account is associated with the share as a collaborator (815). Thus, when changes are made to content and/or metadata that is included in the share, the robot account is notified of the changes. After the content share is configured, the content contained in the share is uploaded from the source repository to the target repository (820).

When changes are made in the target repository to the content and/or metadata of the share, these changes are identified as being associated with the robot account as a collaborator on the share (825). Notification records corresponding to these changes are Then copied to a local notification database associated with the notification server (830). Periodically, the connector server accesses the local notification database to identify changes in target repository which need to be synchronized to the source database (835). The connector server then accesses the identified changes in the target repository and applies these changes to the corresponding content and/or metadata in the source repository (840).

Figure 9:
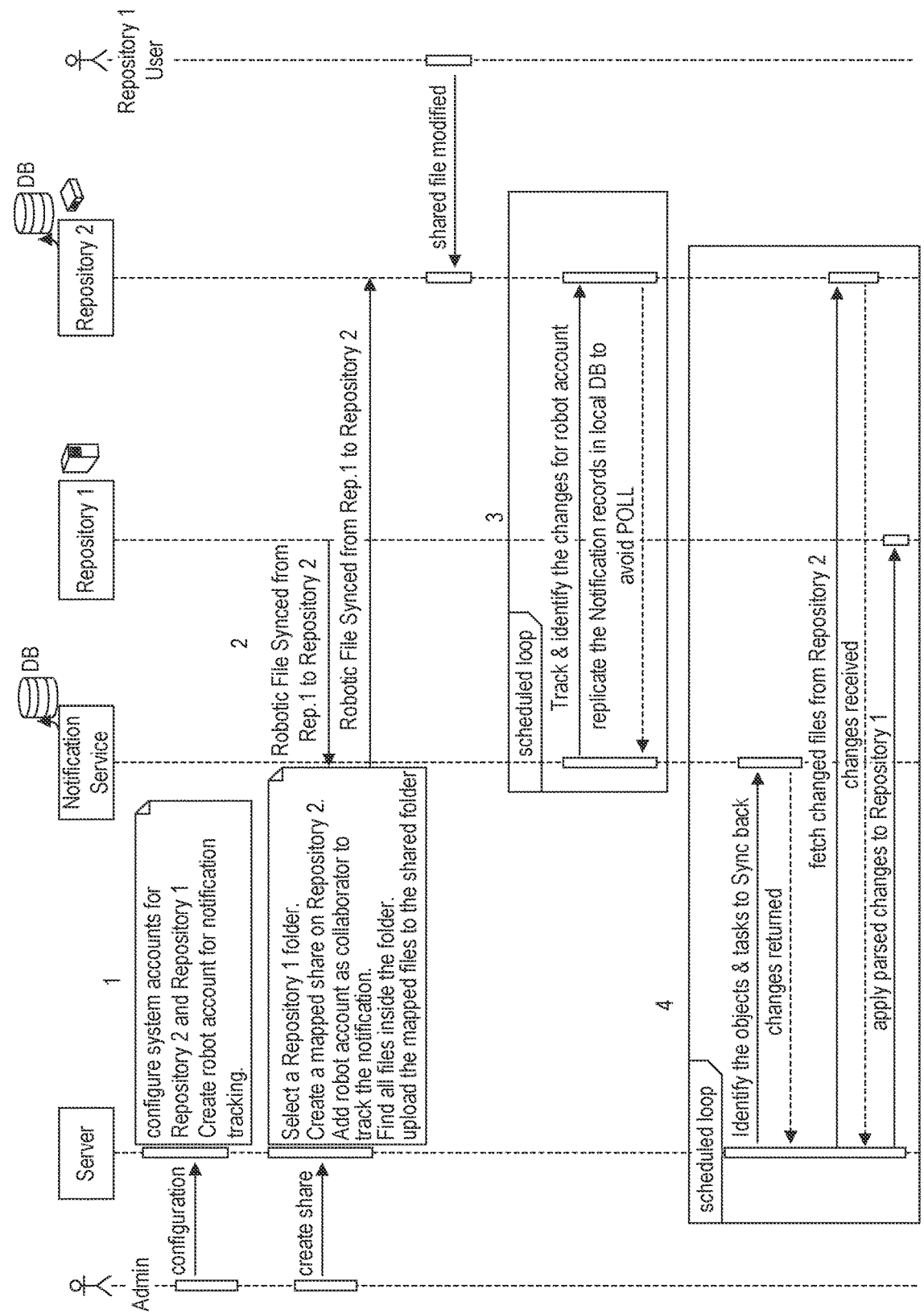
FIG. 9 is a diagram illustrating interactions between an administrative user and components of the repository connector for bidirectional synchronization in accordance with some embodiments.

Referring to FIG. 9, a diagram illustrating interactions between an administrative user and various components of the system in regard to bidirectional synchronization in accordance with some embodiments, particularly with respect to the synchronization of changes from the target repository to the source repository, is shown. As depicted in this figure, an administrative user accesses the connector server to configure the system accounts for the source repository (repository 1) and the target repository (repository 2). In particular, the administrative user creates a robot account which is owned by the connector server. This robot account will be associated with a content share in order to allow the change notifications for the content share to be tracked by the connector server.

After the appropriate accounts have been created, the administrative user creates a content share. The administrative user selects a folder of content on the source repository to be shared onto the target repository. As described above, the administrative user will select a profile that defines a mapping of metadata from the object types on the source repository to the common object type on the target repository. The administrator will add the robot account to the share as a collaborator so that the robot account (hence the connector server) will receive notifications of any changes to the content or metadata included in the share. The connector server will then identify the content objects to be shared (i.e., the objects in the selected folder) and will upload these objects and their respective metadata to the target repository according to the mapping defined profile.

At some point, shared content or its metadata may be changed on the target repository, the notification server will, at scheduled intervals, identify changes to the shared content and/or metadata. Notifications of these changes will be provided to the robot account, and the corresponding notification records will be replicated in a local database of the notification server.

At scheduled intervals, the connector server will access the local notification database of the notification server to identify changes which have been made to the content and/or metadata of the share. Based on the notification records retrieved from the local notification database, the connector server will fetch the corresponding changes from the target repository, and will then apply these changes to the corresponding content and/or metadata of the source repository, thereby synchronizing the shared content between the repositories.

Embodiments of the technology may be implemented on a computing system. Any suitable combination of mobile desktop, server machine, embedded or other types of hardware may be used. One exemplary embodiment may be implemented in a distributed network computing environment. The computing environment in this embodiment may include a client computer system and a server computer system connected to a network (e.g., a local area network (LAN), a wide area network (WAN) such as the Internet, mobile network, or other type of network or combination thereof). The network may represent a combination of wired and wireless networks that network computing environment may utilize for various types of network communications.

The computer systems may include, for example, a computer processor and associated memory. The computer processor may be an integrated circuit for processing instructions, such as, but not limited to a CPU. For example, the processor may comprise one or more cores or micro-cores of a processor. The memory may include volatile memory, non-volatile memory, semi-volatile memory or a combination thereof. The memory, for example, may include RAM, ROM, flash memory, a hard disk drive, a solid-state drive, an optical storage medium (e.g., CD-ROM), or other computer readable memory or combination thereof. The memory may implement a storage hierarchy that includes cache memory, primary memory or secondary memory. In some embodiments, the memory may include storage space on a data storage array. The client computer system may also include input/output ("I/O") devices, such as a keyboard, monitor, printer, electronic pointing device (e.g., mouse, trackball, stylus, etc.), or the like. The client computer system may also include a communication interface, such as a network interface card, to interface with the network.

The memory may store instructions executable by the processor. For example, the memory may include an operating system, a page editing or processing program (e.g., a web browser or other program capable of rendering pages), a server program configured to extend the functionality of the page processing program or other server code. Further, the memory may be configured with a page processable (e.g., capable of being rendered by) by the page editing program. The page may be the local representation of a page, such as a web page, retrieved from the network environment. As will be appreciated, while rendering the page, the page editing/processing program may request related resources, such as style sheets, image files, video files, audio files and other related resources as the page is being rendered and thus, code and other resources of the page may be added to the page as it is being rendered. Application server code can be executable to receive requests from client computers, generate server page files from a set of page assets (e.g., complete web pages, page fragments, scripts or other assets) and return page files in response. A page file may reference additional resources, such as style sheets, images, videos, audio, scripts or other resources at a server computer system or at other network locations, such as at additional server systems.

According to some embodiments, a network environment may be configured with a page such as a web page which is configured to launch and connect to an instance of the server program. The page may include a page file containing page code (HTML or other markup language, scripts or code), stored or generated by the server computer system, that references resources at the server computer system or other network locations, such as additional server computer systems. The page file or related resources may include scripts or other code executable to launch and connect to an instance of the server program.

Those skilled in the relevant art will appreciate that the embodiments can be implemented or practiced in a variety of computer system configurations including, without limitation, multi-processor systems, network devices, mini-computers, mainframe computers, data processors, and the like. Embodiments can be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, stored as firmware in chips, as well as distributed electronically over the Internet or over other networks (including wireless networks). Example chips may include Electrically Erasable Programmable Read-Only Memory (EEPROM) chips.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention. Steps, operations, methods, routines or portions thereof described herein be implemented using a variety of hardware, such as CPUs, application specific integrated circuits, programmable logic devices, field programmable gate arrays, optical, chemical, biological, quantum or nanoengineered systems, or other mechanisms.

Software instructions in the form of computer-readable program code may be stored, in whole or in part, temporarily or permanently, on a non-transitory computer readable medium. The computer-readable program code can be operated on by a processor to perform steps, operations, methods, routines or portions thereof described herein. A "computer-readable medium" is a medium capable of storing data in a format readable by a computer and can include any type of data storage medium that can be read by a processor. Examples of non-transitory computer-readable media can include, but are not limited to, volatile and non-volatile computer memories, such as RAM, ROM, hard drives, solid state drives, data cartridges, magnetic tapes, floppy diskettes, flash memory drives, optical data storage devices, compact-disc read-only memories. In some embodiments, computer-readable instructions or data may reside in a data array, such as a direct attach array or other array. The computer-readable instructions may be executable by a processor to implement embodiments of the technology or portions thereof.

A "processor" includes any hardware system, hardware mechanism or hardware component that processes data, signals or other information. A processor can include a system with a general-purpose central processing unit, multiple processing units, dedicated circuitry for achieving functionality, or other systems. Processing need not be limited to a geographic location or have temporal limitations. For example, a processor can perform its functions in "real-time," "offline," in a "batch mode," etc. Portions of processing can be performed at different times and at different locations, by different (or the same) processing systems.

Different programming techniques can be employed such as procedural or object oriented. Any suitable programming language can be used to implement the routines, methods or programs of embodiments of the invention described herein, including R, Python, C, C++, Java, JavaScript, HTML, or any other programming or scripting code, etc. Communications between computers implementing embodiments can be accomplished using any electronic, optical, radio frequency signals, or other suitable methods and tools of communication in compliance with known network protocols.

Any particular routine can execute on a single computer processing device or multiple computer processing devices, a single computer processor or multiple computer processors. Data may be stored in a single storage medium or distributed through multiple storage mediums.

Although the steps, operations, or computations may be presented in a specific order, this order may be changed in different embodiments. In some embodiments, some steps may be omitted. Further, in some embodiments, additional or alternative steps may be performed. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

It will be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited to only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the meaning of "in" includes "in" and "on" unless the context clearly dictates otherwise.

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

Thus, while the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described. While specific embodiments of, and examples for, the invention are described herein for illustrative purposes only, various equivalent modifications are possible within the spirit and scope of the invention, as those skilled in the relevant art will recognize and appreciate.

As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A repository connector system for synchronization comprising:
    a synchronization server including a processor and a memory, the synchronization server communicatively connected to a first data repository, the synchronization server communicatively connected to a second data repository, the memory storing instructions executable by the processor for:
        configuring one or more content shares from the first data repository to the second data repository, in accordance with one or more user defined mappings of content from the first data repository to the second data repository; and
        for each content share;
            instantiating a notification service instance associated with a notification service running on a notification server of the repository connector system,
            creating a robot account as a collaborator on the content share, the robot account, as a collaborator, monitoring changes on the each content share on the second data repository,
            the notification service instance initiating replication of notification records in the second data repository corresponding to the robot account to a local notification database that is local to the notification server and to the repository connector system, and that is remote from the second data repository, and
            accessing the local notification database at predetermined regular intervals to identify notification records in the local notification database indicating changes in the second data repository to data of the content share, and synchronizing the changes to the first data repository to synchronize the content share to the first data repository.

2. The system of claim 1, wherein each of the one or more content shares comprises a mapped content share, the mapped content share mapping a selected subset of content folders on the first data repository to a corresponding set of content folders on the second data repository.

3. The system of claim 2, wherein each of the selected subset of content folders on the first data repository and the corresponding set of content folders on the second data repository contains one or more content objects, each of the content objects having corresponding metadata.

4. The system of claim 1, wherein the server configures the one or more content shares according to administrative user input received via an administrative configuration interface.

5. The system of claim 1, wherein the notification service instance performs a replication loop in which notification records corresponding to the robot account are identified and replicated to the local notification database according to a predetermined schedule.

6. The system of claim 1, wherein the server performs, according to a predetermined schedule, a synchronization loop in which the server accesses the notification records in the local notification database and synchronizes changes corresponding to the notification records from the second data repository to the first data repository.

7. The system of claim 6, wherein in the synchronization loop the server parses the notification records in the local notification database, identifies from the notification records changes to specific content objects in the second data repository, and makes identified changes to specific content objects in the first data repository corresponding to the specific content objects in the second data repository.

8. A computer implemented repository connector method for synchronization comprising:
    configuring, in a synchronization server of a repository connector system, one or more content shares from a first data repository which is coupled to the synchronization server to a second data repository which is coupled to the synchronization server, in accordance with one or more user defined mappings of content from the first data repository to the second data repository; and
    for each content share:
        instantiating a notification service instance associated with a notification service running on a notification server of the repository connector system,
        creating a robot account as a collaborator on the content share, the robot account, as a collaborator, monitoring changes on the each content share on the second data repository,
        the notification service instance initiating replication of notification records in the second data repository corresponding to the robot account to a local notification database that is local to the notification server and to the repository connector system, and that is remote from the second data repository, and
        accessing the local notification database at predetermined regular intervals to identify notification records in the local notification database indicating changes in the second data repository to data of the content share, and synchronizing the changes to the first data repository to synchronize the content share to the first data repository.

9. The method of claim 8, wherein each of the one or more content shares comprises a mapped content share, the mapped content share mapping a selected subset of content folders on the first data repository to a corresponding set of content folders on the second data repository, and wherein each of the selected subset of content folders on the first data repository and the corresponding set of content folders on the second data repository contains one or more content objects, each of the content objects having corresponding metadata.

10. The method of claim 8, further comprising performing, by the notification service instance, a replication loop in which notification records corresponding to the robot account are identified and replicated to the local notification database according to a predetermined schedule.

11. The method of claim 8, further comprising performing, by the server according to a predetermined schedule, a synchronization loop in which the server accesses the notification records in the local notification database and synchronizes changes corresponding to the notification records from the second data repository to the first data repository.

12. The method of claim 11, further comprising, by the server in the synchronization loop, parsing the notification records in the local notification database, identifying from the notification records changes to specific content objects in the second data repository, and making identified changes to specific content objects in the first data repository corresponding to the specific content objects in the second data repository.

13. A computer program product comprising a non-transitory computer-readable medium storing instructions executable by one or more processors to perform:
configuring one or more content shares from a first data repository which is coupled to a synchronization server of a repository connector system, to a second data repository which is coupled to the synchronization server, in accordance with one or more user defined mappings of content from the first data repository to the second data repository;
for each content share;
instantiating a notification service instance associated with a notification service running on a notification server of the repository connector system,
creating a robot account as a collaborator on the content share, the robot account, as a collaborator, monitoring changes on the each content share on the second data repository,
the notification service instance initiating replication of notification records in the second data repository corresponding to the robot account to a local notification database that is local to the notification server and to the repository connector system, and that is remote from the second data repository; and
accessing the local notification database at predetermined regular intervals to identify notification records in the local notification database indicating changes in the second data repository to data of the content share, and synchronizing the changes to the first data repository to synchronize the content share to the first data repository.

14. The computer program product of claim 13, wherein each of the one or more content shares comprises a mapped content share, the mapped content share mapping a selected subset of content folders on the first data repository to a corresponding set of content folders on the second data repository, and wherein each of the selected subset of content folders on the first data repository and the corresponding set of content folders on the second data repository contains one or more content objects, each of the content objects having corresponding metadata.

15. The computer program product of claim 13, wherein the instructions are further executable by the one or more processors to perform a replication loop in which notification records corresponding to the robot account are identified and replicated to the local notification database according to a predetermined schedule.

16. The computer program product of claim 13, wherein the instructions are further executable by the one or more processors to perform, according to a predetermined schedule, a synchronization loop in which the server accesses the notification records in the local notification database and synchronizes changes corresponding to the notification records from the second data repository to the first data repository.

17. The computer program product of claim 16, wherein the instructions are further executable by the one or more processors to perform, in the synchronization loop, parsing the notification records in the local notification database, identifying from the notification records changes to specific content objects in the second data repository, and making identified changes to specific content objects in the first data repository corresponding to the specific content objects in the second data repository.

* * * * *

UNITED STATES PATENT AND TRADEMARK OFFICE
CERTIFICATE OF CORRECTION

| | | |
|---|---|---|
| PATENT NO. | : 12,242,426 B2 | Page 1 of 1 |
| APPLICATION NO. | : 17/462789 | |
| DATED | : March 4, 2025 | |
| INVENTOR(S) | : Pardeep Kumar et al. | |

It is certified that error appears in the above-identified patent and that said Letters Patent is hereby corrected as shown below:

On the Title Page

(73) Assignee: Open ext Holdings, Inc. should read "Open Text Holdings, Inc."

Signed and Sealed this
Tenth Day of June, 2025

Coke Morgan Stewart
*Acting Director of the United States Patent and Trademark Office*